Feb. 3, 1953
F. D. DE VANEY
2,627,399
CEMENT MANUFACTURE
Filed Nov. 18, 1947
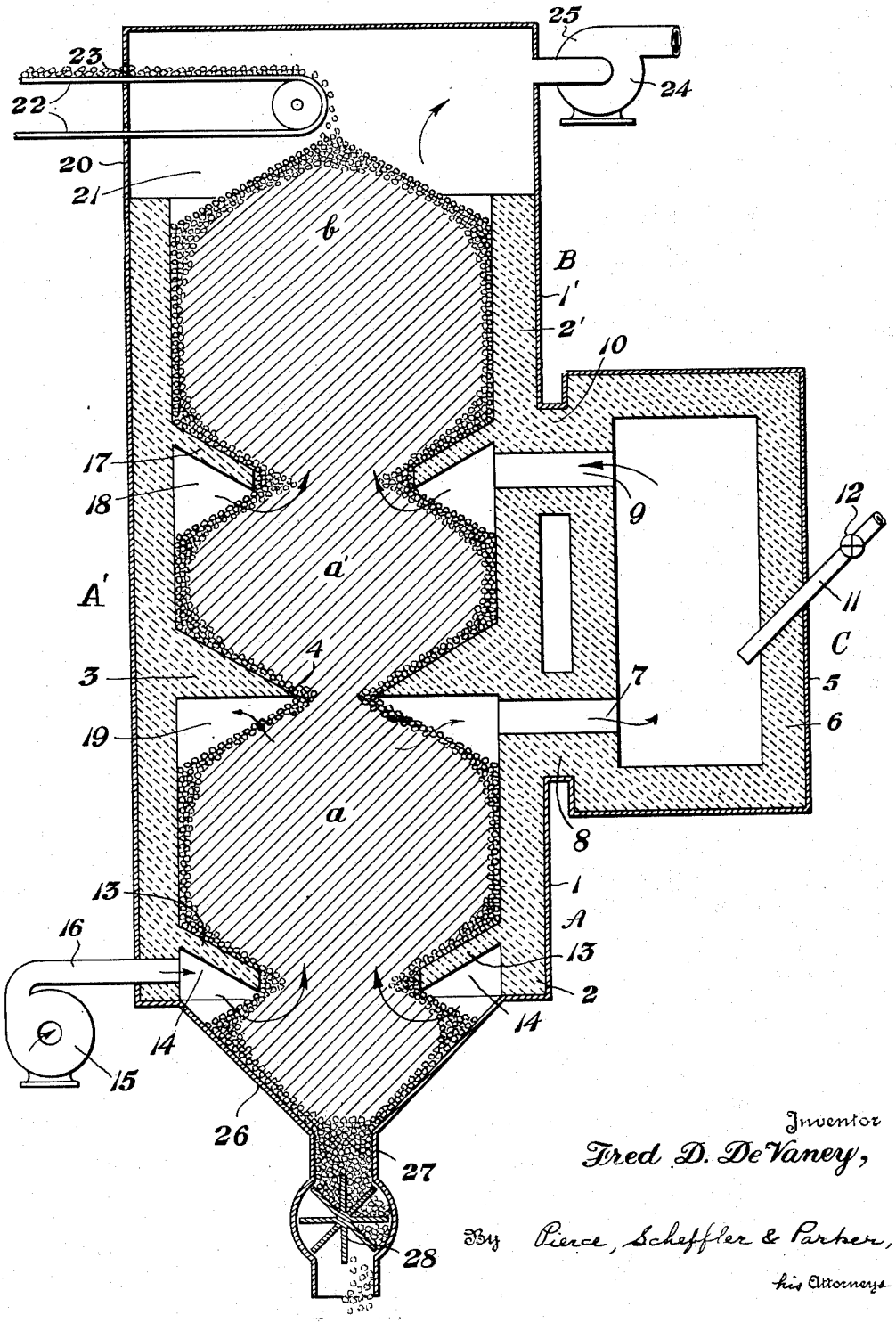
Inventor
Fred D. DeVaney,
By Pierce, Scheffler & Parker,
his Attorneys Patented Feb. 3, 1953

2,627,399

UNITED STATES PATENT OFFICE 2,627,399

CEMENT MANUFACTURE

Fred D. De Vaney, Hibbing, Minn., assignor to Erie Mining Company, Hibbing, Minn., a corporation of Minnesota Application November 18, 1947, Serial No. 786,645

2 Claims. (Cl. 263—53)

This invention relates to the art of manufacturing Portland cement, and is particularly concerned with improvements in the step of producing cement clinker.

In the currently conventional practice, the raw cement making materials are, after coarse crushing, ground to fine particle size (e. g., 91% minus 200 mesh), by either a wet or a dry grinding process, and the finely divided material is fired in a fluid fuel-fired rotary kiln at a temperature of from 2600° to 2800° F. to effect four results, viz.:

1. Evaporation of the water,
2. Dehydration of the clay,
3. Calcination of the magnesium and calcium carbonates, and
4. Reactions between the solid oxides (silica, alumina, magnesia and lime).

Generally, fusion of the reaction mixture results, and the immediate product is a "clinker" which requires fine subdivision before becoming a marketable product. This operable process suffers the disadvantage that it expends a very large amount of heat (e. g., about 6,430,000 B. t. u. per ton of product). Customarily, the exhaust gases from the cement kiln average 420° F., and the clinker is discharged from the clinker coolers at about 200° F. or above. These substantial heat losses are materially exceeded by the inescapable radiation losses from the long, essentially uninsulated kiln.

According to the present invention, the conventional raw cement making materials are, after being ground to conventional particle size, formed into pellets—consisting essentially of the powderous raw cement making materials and water—by a balling-up process similar to that disclosed in Firth Patent No. 2,411,873, and the initially moist pellets are fired in a stationary vertical furnace, of particular type, by means of a current of heating gas moving countercurrently to a descending column of such pellets, as more specifically described hereinbelow.

In the pelletizing step, the finely divided raw cement making materials in conventional proportions are associated with sufficient water—usually 30 to 38% by weight, based on the dry weight of the powderous mix—to form a plastic mass. The plastic mass, well pugged to secure desirable homogeneity, is fed to an inclined rotary balling-up drum of the Firth type and therein is slowly worked, by the Firth technique, into dense pellets of from 0.75 to 1.5 inches diameter.

The initially moist, "raw" pellets are fed to the upper surface of the uppermost of three masses, contained within three thermally insulated chambers disposed one above the other and communicating through connecting conduits of restricted cross-sectional area, constituting a double dumbbell-shaped substantially vertical column of similar pellets. As raw pellets are fed to the stockline, an equivalent volume of fired and cooled pellets are discharged from the base of the column, thereby effecting the progressive downward movement of the pellets through the three-chambered furnace. In the upper portion of the uppermost chamber the initially moist pellets are dried and incipiently hardened, and as they descend through the remainder of the uppermost chamber of the furnace their temperature is progressively raised to optimum "firing" temperature by means of a current of heating gas forced upwardly through the column. The highly heated pellets descend from the uppermost chamber into the intermediate chamber, through the restricted conduit connecting the same, wherein they remain for a considerable interval (i. e., the time span for their gradual descent therethrough) at an elevated temperature of the order of that at which they had passed out of the uppermost chamber; thereupon, the still highly heated pellets descend, through the restricted conduit connecting the intermediate with the lowermost chamber, into the lowermost chamber of the furnace, and, during their gradual descent through the latter, transfer their heat to a current of cooling gas forced upwardly through the column, with the result that the fired pellets are discharged from the furnace at a temperature not materially in excess of that of the ambient air.

The cooling gas, e. g. air, which is preheated by heat exchange from the hot pellets during its passage through the mass of pellets contained in the lowermost chamber of the furnace, is withdrawn from the top of the lowermost chamber and passed to a thermally insulated combustion chamber wherein the preheated air is thermally enriched, by combustion of a fluent fuel fed thereinto, to the desired firing temperature. The resulting highly heated air-combustion products mixture thereupon is forced upwardly through the mass of pellets contained in the uppermost chamber of the furnace, to which pellets it transfers its heat, exiting from the top of the uppermost chamber at a temperature not materially in excess of the boiling point of water.

It will be appreciated that with a minimization of radiation losses by adequate thermal insulation of the apparatus, the necessary heat expenditure in my improved process is mainly or wholly that represented by the heat expended in evaporating the water content of the initially moist raw pellets. In addition to the important feature of saving a large fraction of the heat, the main advantages of my improved process over conventional rotary kiln practice are:

1. Lower operating costs (no moving parts, and less maintenance on refractories);
2. Much cheaper first cost (stationary vertical furnace versus rotary kiln);
3. No clinker coolers required;
4. "Ring" formation, a disadvantage inherent in the conventional process, is avoided;
5. Greater homogeneity, and general improvement, of product;
6. Lower cost of grinding the clinker; and
7. Better temperature control possible.

The method of the present invention has potential advantage in that the step of rolling up the pellets effects a very intimate and homogeneous association of the components of the cement mix, akin to that upon which the success of powder metallurgy technique depends. In the present process, the mixed finely divided particles constituting the pellets are pressed together, in the pellet rolling stage, at a pressure equal to or in excess of 10 tons per square inch, which pressure insures exceedingly close contact of particles facilitating chemical reactions therebetween when the pellets are held at high temperature (but short of actual fusion of the particles) for an extended interval of time.

In connection with the mentioned features the following is noted: I have found that in carrying out the firing of the pellets, it is not necessary, in general, to heat the pellets to conventional firing temperature, in that satisfactory reaction between the solid oxides content of the pellets is had at temperatures below material fusion. Thus, I have found that when the pellets are heated to a top temperature of about 2000° F. and there maintained for an interval, not only are the carbonates completely calcined but also the resulting alkaline earth oxides are substantially completely reacted with silica, leaving substantially no free alkaline earth oxides. While some fusion may occur in the firing of the pellets, it is not sufficient to cause substantial sticking together of the pellets.

In the conventional technique, the temperatures existing through any cross-section of the rotary kiln vary widely, with the result that in some zones fusion is complete whereas in other zones the more refractory oxides, due to the looseness of association of the particles and to the lack of homogeneity of the same, are not totally reacted. This commonly is evidenced by the presence of unreacted calcium oxide in the clinker product. The homogeneity and closeness of association secured through the rolling up of the moist particles into pellets are of a different order of magnitude than can be secured through briquetting or lumping of the mass.

The invention will now be described in greater particularity, and with reference to the appended drawing in which the single figure is a diagrammatic representation of apparatus operable for use in carrying out the present invention.

In the drawing, the furnace is constituted by communicating chambers A, A' and B which in cooperation provide a substantially vertical shaft having a generally tubular (e. g., cylindrical) outer metallic shell 1 enclosing a relatively thick tubular refractory wall 2. Wall 2 may be and preferably is formed of refractory brick or refractory brick backed with insulating brick. Chambers A and A' are separated by a dished annulus 3, of refractory material provided with an axially central opening or conduit 4 of restricted cross-sectional area. Chambers A' and B are separated by an annular depending wall 17 of refractory material which depending wall slopes inwardly to define at its lower extremity a connecting conduit of restricted cross-sectional area between chambers A' and B.

A combustion chamber C is disposed beside chambers A and B and generally opposite the immediate chamber A'. The combustion chamber is formed, like A, A' and B, of a metallic shell 5 with a relatively thick refractory lining 6, and its interior communicates with the top of chamber A through conduit 7— thermally insulated as at 8— and with the bottom of chamber B through conduit 9— thermally insulated as at 10. A burner nozzle 11 extends, through walls 5, 6, into the interior of chamber C and may be tangentially and downwardly disposed as illustrated. Burner nozzle 11 communicates with a source (not shown) of fluid fuel through valved fuel pipe 12.

Chamber A is provided, adjacent its bottom, with an annular depending wall 13 which slopes downwardly and provides a gas space therebeneath. Pellets moving by gravity through chamber A are forced to move toward the axis of A by annular wall 13 and when past its lower edge roll out again to the periphery of the chamber: an annular lower free space 14, adjacent a free surface of extensive area, of a column $a$ of pellets in chamber A, thereby is provided. Free space 14 communicates with the pressure side of blower 15 through conduit 16.

Similarly depending wall 17, separating chambers A' and B, provides an extensive free space 18 therebeneath. Said free space 18 communicates with combustion chamber C through lagged conduit 9.

The annulus 3 separating chambers A and A' is so disposed with relation to the vertical walls of A' as to provide in A' an upper free space 19 immediately adjacent to and co-extensive with an upper free surface, of extensive area, of bed $a$. Space 19 communicates with combustion chamber C through lagged conduit 7.

The upper end of chamber B is closed off by a cylindrically shaped hood or dome 20 of sheet metal, providing above the normal stockline of a column $b$ of pellets contained in chamber B an upper free space 21 coextensive with the top surface of said column. Mechanism for substantially continuously replenishing the column $b$ with raw pellets is diagrammatically illustrated by conveyor feeding means 22 entering hood 20 through an appropriate opening 23 in said hood and extending to the vertical axis of the furnace where it discharges its burden of pellets onto the top of column $b$.

Upper free space 21 may, if desired, communicate with the suction side of a blower 24 through a conduit 25, as illustrated, for assisting blower 15 in positively moving a gas (air) current through chambers A, C and B.

Chamber A beneath annular wall 13 is terminated by a conical bottom 26 which may slope at an angle at least equal to the angle of repose of the pellets being treated. Discharge pipe 27 depends axially from the conical bottom 26 of chamber A, and is provided adjacent its lower end with a star gate discharge device 28. Star gate 28 is driven by conventional driving means (not shown) adapted to drive the star gate at a variable controlled speed for the controlled discharge of treated pellets from the apparatus.

In operation, raw pellets are continuously fed to hopper topped feed inlet 22, and a corresponding volume of thermally treated and cooled pellets is continuously discharged at 28, inducing the progressive gravitational movement of columns $a$, $a'$ and $b$ through the furnace. In the first several inches of their downward travel in column $b$ the pellets are dried and incipiently hardened. As they continue to descend in column $b$ they are progressively heated until at the level of the lower edge of wall 17 they have been heated to from 2000° to 2800° F.—depending on the predetermined optimum reaction temperature for the particular mix being processed. The highly heated pellets descend through the restricted conduit provided by depending wall 17 into intermediate chamber A' to constitute pellet mass $a'$, in which chamber the pellets remain for a considerable interval at substantially their entrant temperature. The pellets of mass $a'$ gradually descend through restricted conduit 4 into chamber A to constitute a part of column $a$. In their gravitational movement through A the pellets are progressively cooled—by heat transfer to the countercurrent of air passing therethrough—and finally are discharged from the apparatus through star gate 28 at a temperature approaching that of the incoming air current.

Simultaneously, a current of atmospheric air is forced by blower 15 through conduit 16 into lower annular open space 14. The air current thence passes into column $a$ and ascends therethrough, being preheated by heat transferred to it from the pellets in column $a$, to upper annular open space 19. The preheated air passes through conduit 7 into combustion chamber C, wherein it supports the combustion of fuel fed into C through nozzle 11. Sufficient fuel is used to raise the temperature of the air from its particular preheat temperature to the optimum firing temperature (2000°–2800° F.) for the pellets, and the resulting highly heated air-combustion products mixture passes through conduit 9 into upper annular open space 17 of chamber A'. From thence it passes through the pellets descending from chamber B through the restricted conduit provided by the lower extremity of depending wall 17 and enters column $b$ and ascends therethrough to upper open space 21 and from thence exits through conduit 25 either under its own pressure or (as indicated in the drawing) under the influence of suction means 24. In its passage through the column $b$ the initially highly heated gas progressively loses heat to the pellets until it escapes the top of column $b$ at a temperature of 220–250° F. The pellets in the zone nearer the level of the lower edge of wall 17 are heated to maximum temperature, while the pellets in the intermediate zone of column $b$ simultaneously are heated at an intermediate temperature. It is noted that mass $a'$ is not traversed, to any substantial extent, by the gas current passing through masses $a$ and $b$. Consequently, its pellets are maintained at a substantially constant elevated temperature conducive to inter-particle reactions. It is to be understood that the height of mass $a'$ (wherein substantially uniform high temperature obtains) may be made as great as desired for completion of the several reactions. Lengthening this portion of the column of pellets does not add to the blowing cost or to the fuel cost because said mass $a'$ is in a zone where gases are not being forced through the column; it is in effect an insulated "soaking pit."

As will be appreciated by those skilled in the art, the feeding conveyor means 22 may be caused to traverse, by known means, a circular path over the stockline of column $b$. In lieu thereof, the pellet feeding means may be an adaptation of the feeder described and claimed in De Coriolis and Campbell application entitled "Furnace Loading Mechanism," filed November 5, 1947, Serial No. 784,220, now U. S. Patent No. 2,538,556, issued January 16, 1951. Any other operable means for distributing the raw pellets over the stockline may be used in place of the one illustrated. Or, the raw pellets may first be dried and preliminarily indurated in a tunnel kiln, mounted on the top chamber B, before being discharged into the latter, which concept is described and claimed in my copending application Serial No. 786,644, filed November 18, 1947, now abandoned, entitled "Pellet Induration Apparatus and Process."

Preferably, the heat capacity of the highly heated gas current entering chamber B is adjusted, with respect to the heat capacity of the pellets, to insure that the temperature at the midpoint (vertically measured) of column $b$ is materially higher than the average of the temperatures obtaining at the gas inlet point and at stockline of column $b$. By suitable adjustment of (1) the rate of blowing and (2) the amount of fuel addition at C, the thermal gradient in column $b$ can be so controlled as to insure that the initially raw pellets have been dried and at least partially heat-hardened by the time they have descended below the stockline a predetermined number of inches (e. g., from 8 to 16 inches).

I claim:

1. Apparatus for firing small spheroids of raw Portland cement mix, which comprises a thermally insulated, generally vertical and tubular, furnace shaft provided with top and bottom closure members to define a shaft furnace; a plurality of spaced annular imperforate shelf members extending inwardly from the furnace shaft and dividing the interior of the furnace shaft into an uppermost zone, an intermediate zone and a lowermost zone in series with axially central connecting conduits or restricted cross-sectional area therebetween, said series of zones being adapted to be gravitationally traversed by a charge of small spheroids, said shelf members cooperating with said furnace shaft to provide annular open spaces, not traversable by such gravitationally descending charge, beneath said shelf members and in the upper parts of the intermediate and lowermost zones; means for charging spheroids onto the stockline of a column of such spheroids within and generally filling said furnace shaft and its bottom closure member save for said annular open spaces; means for removing spheroids from beneath said bottom closure member; a combustion chamber spacially separate from said furnace shaft; means for injecting fuel into said combustion chamber; conduits communicating between the interior of the combustion chamber and the open spaces in the upper parts of the intermediate and lowermost zones of said furnace shaft; means for forcing a current of combustion-supporting gas upwardly through the lowermost zone to the open space in the upper part thereof, thence to and through the combustion chamber, thence to the open space in the upper part of the intermediate zone, and thence upwardly through the uppermost zone.

2. In the process of forming Portland cement clinker from a mix of finely divided cement making materials the improvements which consist in rolling up a water-wet, homogeneous, plastic mix of the finely divided materials into dense pellets wherein the homogenously mixed finely divided components are held together under pressure, charging the resulting initially moist raw pellets onto the upper surface of a gradually descending column of similar pellets contained in a vertical furnace chamber, passing a current of heating gas, initially at optimum firing temperature, into said column at a first level intermediate the midpoint and top thereof and countercurrently through the uppermost portion of said column, so maintaining the heat capacity of the heating gas current with respect to the heat capacity of the pellets contacted by said heating gas current that the heating gas departs from the top of said column at a temperature above but close to its dew point, countercurrently forcing initially substantially unheated air through the lowermost portion of said column whereby to cool the pellets in said lowermost portion and simultaneously preheat the air, diverting the preheated air from the column at a second level intermediate the midpoint and bottom thereof to a spacially separate combustion chamber, thermally enriching the preheated air to desired firing temperature by introducing fuel into and burning the same in the preheated air in said combustion chamber, and using the resulting highly heated air-combustion products gas mixture as the heating gas passed through the uppermost portion of said column, the intermediate portion of the column between said first and second levels being a substantial part of the total column and constituting a zone, substantially not traversed by the gas stream, wherein pellets heated to a high temperature short of substantial fusion are maintained for an extended period sufficient to gain substantial completion of inter-particle cement-forming reactions.

FRED D. DE VANEY.

REFERENCES CITED

The following references are of record in the file of this patent:

UNITED STATES PATENTS

| Number | Name | Date |
|---|---|---|
| 1,132,527 | Schneider | Mar. 16, 1915 |
| 1,166,904 | Harding | Jan. 4, 1916 |
| 2,037,809 | MacMullin | Apr. 21, 1936 |
| 2,052,329 | Wendeborn | Aug. 25, 1936 |
| 2,121,733 | Cottrell | June 21, 1938 |
| 2,163,513 | Douglass | June 20, 1939 |
| 2,174,066 | Ahlmann | Sept. 26, 1939 |
| 2,280,571 | Dionisotti | Apr. 21, 1942 |
| 2,345,067 | Osann | Mar. 28, 1944 |
| 2,529,366 | Bauer | Nov. 7, 1950 |